3,210,170
PROCESS FOR THE PRODUCTION OF GASES FROM HYDROCARBON OIL AND REMOVAL OF CARBON PARTICLES THEREFROM
Peter Van't Spijker, Martinus Kolijn, and Pieter Roest, all of The Hague, Netherlands, assignors to Shell Oil Company, New York, N.Y., a corporation of Delaware
No Drawing. Filed June 26, 1961, Ser. No. 119,350
Claims priority, application Netherlands, July 5, 1960, 253,426
1 Claim. (Cl. 48—212)

The invention relates to a process for the removal of soot from suspensions thereof in water with the use of a water-immiscible auxiliary liquid and with separation of the aqueous phase from the resultant mixture of soot and auxiliary liquid.

Such a process was already known from the U.S. Patent specification No. 2,665,980. According to this patent specification, the aqueous phase separated may be used again for suspending soot; this phase may also be removed, for instance as waste water. In any case it is important for the aqueous phase drained off to be as clean as possible but in practice it is found that this is far from being the case and that the aqueous phase separated varies in purity from not quite clean to considerably contaminated.

It has now been found that this drawback is obviated by filtering the aqueous phase separated off by means of a filter material containing or consisting of granular silica. The grains may be fairly uniform in shape (for example, substantially spherical, as is the case with river gravel), or be fairly irregular in shape, for example, having a sharp-edged, corrugated, jagged or perforated, etc., surface.

When filtering even concentrated soot suspensions, the use of fine-mesh cloth filters or filter presses has hitherto always been considered necessary but it has now been found that a simple filter containing silica will suffice for the removal of the last quantities of impurities. A filter of this type may be regenerated in a much simpler manner than in the case of the other filters referred to, viz., by renewing part of the granular material. In addition, the spent filter material may often be readily reactivated by washing, burning off and similar treatments and this reactivation can only be effected with far more difficulty in the case of the said other filter types. In many cases it is even possible to make up to a considerable extent the decline in capacity which occurs after continued use without an actual regeneration being carried out, viz., by working loose the granular material. This is of course not practicable with cloth filters.

Fairly coarse-grained filters will generally suffice, i.e., such filters in which the grain size of the filter material, or of the smallest grains therein, if grains of different sizes are used, is approximately 1 mm.

Sand has been found to be particularly suitable for use as granular material for the present purpose. Sand-filters were already known for the separation of inorganic materials (minerals and the like) but it has now been found that they can be used for the separation of fine soot particles to which usually some organic separating liquid also adheres, without causing rapid clogging of the filter channels.

According to the degree of contamination of the aqueous phase and of the granular material used, filtration may be carried out with the use of different arrangements of the filter material. It is, for instance, often preferred to filter by means of an at least substantially homogeneous mixture of grains having a number of different grain sizes, in which case the width of the channels also differs considerably.

Filtration may also be suitably carried out by means of a number of layers of grains in which the grains in one layer are at least substantially uniform in size, but the grain size of the different layers varies. Hence the aqueous phase to be purified has to flow successively through channels of varying width. It is especially useful for the variation in these channel widths to be unidirectional, i.e., that in this case filtration is carried out by means of layers of grains the size of which increases in successive layers.

The coarse-grained layers need not be replaced for a considerable period. In order to regenerate a filter of this type it is sufficient merely to effect the continuous or intermittent renewal of the layer with the smallest grain size.

The aqueous phase to be purified may be passed through the filter layers in the direction from the largest to the smallest grain size but the aqueous phase is preferably passed through in the opposite direction.

At least some of the impurities still present in the aqueous phase before filtration are frequently lighter than water; for example, because a relatively large quantity of the organic liquid (which itself is often light) adheres to it. It order to reduce the frequency of renewal of the granular material this portion of the impurities may be removed separately as far as possible; for instance, by keeping the granular material covered with a thin layer of the aqueous phase and skimming the impurities floating on it, thereby preventing their contaminating effect on the filter material.

The invention is further illustrated by the following examples.

*Example I*

A soot suspension obtained by the water washing of gases, prepared by the partial combustion of a hydrocarbon oil with an underdose of oxygen, was converted by treatment with gas oil into an aqueous phase containing soot aggregates. The latter were separated from the aqueous phase by means of a perforated endless belt, after which the aqueous phase still contained a considerable quantity of contaminations. This phase was fed at a linear rate of 6.0 m./h. to a filter having a surface area of 1.14 sq. m. and consisting of three layers of sand particles, i.e., a 14 cm.-thick layer containing particles of 1–2 mm.; an 8 cm.-thick layer containing particles of 2–3 mm.; and a 12 cm.-thick layer containing particles of 3–5 mm. The effluent water from this filter was entirely clear. After 6 hours, i.e., after as much as 41 cu. m. of water had flowed through, the filter became clogged but until then the degree of purity of the effluent water had not deteriorated. The filter could be reactivated by raking the fine-grained upper layer.

*Example II*

A similar experiment was repeated with a filter consisting of three layers of equal thickness, i.e., of 15 cm. The grain sizes in the different layers were the same as indicated above. In this instance the flow rate was slightly lower, i.e., 5.7 m./h. The filter became clogged only after 9 hours, i.e., after 58 cu. m. of the aqueous phase had flowed through; until then the effluent water remained perfectly clear. The filter could be used for an indefinite period of time by replacing the layer of 1–2 mm. grains by fresh material once a day; the same result could be obtained by renewing only approximately 2 to 3 cm. of the said layer 4–6 times a day.

*Example III*

Through the above-mentioned filter consisting of three layers of equal thickness was passed an aqueous phase formed during the working up of a soot suspension obtained by partial combustion with an underdose of oxygen of a hydrocarbon oil which was considerably heavier and more viscous than the previous one. The material was passed through at a flow rate of 6.1 m./h. In this case also the filter became clogged only after a considerable period, viz., after 7 hours, i.e., after 49 cu. m. had passed through; in this case also the filter could be readily reactivated each time.

We claim as our invention:

In a process for the production of gases from hydrocarbon oil wherein said oil is reacted with a reduced amount of oxygen to produce a product gas stream containing carbon particles, the improvement which comprises: water washing said product gas stream thus effecting removal of the carbon particles from the gas stream and producing a dispersion of carbon particles in water, mixing a hydrocarbon oil therewith whereby the majority of said carbon particles form into soot aggregates, separating said soot aggregates from the aqueous phase and thereafter passing said aqueous phase through a granular silica filter bed whereby the remainder of the carbon particles are removed from the aqueous phase.

References Cited by the Examiner

UNITED STATES PATENTS

| | | | |
|---|---|---|---|
| 1,629,085 | 5/27 | Robertson | 210—290 |
| 2,217,690 | 10/40 | Laughlin | 210—270 |
| 2,665,980 | 1/54 | Carkeek | 48—196 X |
| 2,894,603 | 7/59 | Vasan. | |

MORRIS O. WOLK, *Primary Examiner.*

EUGENE F. BLANCHARD, *Examiner.*